United States Patent
Booij

(10) Patent No.: US 12,117,551 B2
(45) Date of Patent: *Oct. 15, 2024

(54) FREQUENCY-SHIFT DETERMINATION

(71) Applicant: Sonitor Technologies AS, Oslo (NO)

(72) Inventor: Wilfred Edwin Booij, Oslo (NO)

(73) Assignee: Sonitor Technologies AS, Oslo (NO)

( * ) Notice: Subject to any disclaimer, the term of this patent is extended or adjusted under 35 U.S.C. 154(b) by 282 days.

This patent is subject to a terminal disclaimer.

(21) Appl. No.: 17/765,938

(22) PCT Filed: Oct. 2, 2020

(86) PCT No.: PCT/GB2020/052432
§ 371 (c)(1),
(2) Date: Apr. 1, 2022

(87) PCT Pub. No.: WO2021/064419
PCT Pub. Date: Apr. 8, 2021

(65) Prior Publication Data
US 2022/0308158 A1    Sep. 29, 2022

(30) Foreign Application Priority Data
Oct. 2, 2019 (GB) ...................... 1914236

(51) Int. Cl.
*G01S 11/14* (2006.01)
*G01S 5/30* (2006.01)

(52) U.S. Cl.
CPC ................ *G01S 5/30* (2013.01); *G01S 11/14* (2013.01)

(58) Field of Classification Search
CPC .................... G01S 5/30; G01S 11/14
See application file for complete search history.

(56) References Cited

U.S. PATENT DOCUMENTS

| 10,670,693 B2 | 6/2020 | Booij |
| 10,966,056 B1 | 3/2021 | Amir |

(Continued)

FOREIGN PATENT DOCUMENTS

| CA | 3 086 955 A1 | 7/2019 |
| CN | 111837051 A | 10/2020 |

(Continued)

OTHER PUBLICATIONS

Notification of Transmittal of the International Search Report and the Written Opinion of the International Searching Authority, or the Declaration, issued in PCT/IB2018/060660, mailed Apr. 25, 2019, 12 pages.

(Continued)

*Primary Examiner* — Luke D Ratcliffe
*Assistant Examiner* — Abdallah Abulaban
(74) *Attorney, Agent, or Firm* — Sterne, Kessler, Goldstein & Fox P.L.L.C.

(57) ABSTRACT

A receiving apparatus (7) that can estimate a motion-induced frequency shift in a received signal comprises a processing system (205) and a receiver (204) configured to receive a signal comprising one or more instances of a transmitted signal. The processing system (205) is configured to generate data representative of a plurality of impulse response functions by deconvolving the received signal with each of a plurality of templates representative of the transmitted signal shifted in frequency by a different respective frequency shift. The processing system (205) is further configured to evaluate a signal-to-noise measure for each of the plurality of impulse response functions, and to identify an impulse response function of the plurality of impulse response functions for which the signal-to-noise measure satisfies a peak criterion.

20 Claims, 4 Drawing Sheets

(56) References Cited

U.S. PATENT DOCUMENTS

| | | |
|---|---|---|
| 11,506,747 B2 | 11/2022 | Booij |
| 2013/0083631 A1 | 4/2013 | Harrell et al. |
| 2014/0112103 A1 | 4/2014 | Goldman |
| 2019/0204408 A1 | 7/2019 | Booij |
| 2019/0204409 A1 | 7/2019 | Booij et al. |
| 2019/0339386 A1 | 11/2019 | Ding et al. |
| 2020/0371194 A1 | 11/2020 | Booij |
| 2023/0228838 A1 | 7/2023 | Booij |

FOREIGN PATENT DOCUMENTS

| | | |
|---|---|---|
| WO | WO 2010/084308 A2 | 7/2010 |
| WO | WO 2013/048708 A1 | 4/2013 |
| WO | WO 2018/162855 A1 | 9/2018 |
| WO | WO 2019/038542 A2 | 2/2019 |
| WO | WO 2019/130242 A1 | 7/2019 |

OTHER PUBLICATIONS

Khyam et al., "Mobile ultrasonic transducer positioning," The Journal of Engineering, Received on Mar. 15, 2017; Accepted on Mar. 22, 2017, 4 pages.

International Search Report mailed Nov. 30, 2020 for PCT Appl. No. PCT/GB2020/052432, 4 pages.

Written Opinion mailed Nov. 30, 2020 for PCT Appl. No. PCT/GB2020/052432, 6 pages.

FREQUENCY-SHIFT DETERMINATION

BACKGROUND OF THE INVENTION

This invention relates to apparatus and methods for determining a frequency shift in a signal.

It is known to use signals, such as ultrasonic signals, to track the position of mobile units, or tags, in two or three dimensions, by transmitting signals from a plurality of transmitter units, which may be fixed to the walls or ceilings of a building. The signals encode identifiers of the respective transmitters units. These signals are received by the mobile receiver units, which may be attached to objects such as people or equipment. If the positions of the static transmitter units are known, the times of arrival of signals from the transmitter units at a mobile unit can be used to estimate the position of the mobile unit in the environment, based on geometric principles such as the intersection of circles or spheres.

In WO 2019/038542 the present applicant disclosed real-time locating systems (RTLS) in which a plurality of static transmitter units transmit respective quadrature-phase-shift-key (QPSK) encoded ultrasonic signatures comprising respective Complementary-Code-Keying (CCK) codes. Each signature is specific to a respective transmitter unit. The signatures are received by a mobile device and their times of arrival are used to determine the three-dimensional position information for the mobile device. In order to decode a received signature, and accurately determine its arrival time, a cross-correlation operation is performed, correlating the received signal against each of a set of CCK code templates in the time domain. Because the mobile device may be in motion as the signals are received, the frequency and phase of the received signals may be distorted due to Doppler shift. In order to provide better accuracy, a motion-induced Doppler shift is therefore estimated from the received signal, before the cross-correlation, and one or other of the received signal and the templates are compensated for any phase shift before the cross-correlation operation is performed.

In WO 2019/130242 the present applicant disclosed a development which supports accurate decoding of a QPSK CCK transmitter signature even when multi-path reflections cause multiple instances of the signature to be received overlapping in time. A cross-correlation-based decoding can perform poorly in such circumstances. The received signal is instead deconvolved using different candidate signature templates to calculate respective response function estimates. The signature is then decoded based on which template gives rise to a response function having the highest signal-to-noise ratio. Again, to allow for distortion due to any relative movement, one or other of the received signal and the templates are compensated for any motion-induced Doppler shift before the deconvolution is performed. This involves estimating a frequency shift in the received signal by cross-correlating the received signal with respective signature templates, in the frequency domain, and determining a frequency offset in the cross-correlation trace at which the highest correlation peak occurs.

This deconvolution-based approach has been found to provide reliable decoding when receiving QPSK-modulated CCK codes, even in the presence of overlapping echoes, which can commonly arise in an indoor environment, given the relatively long transmission times required when using low-frequency ultrasound. The peaked nature of the frequency-domain representation of the CCK codes has been found to lend itself well to generating accurate estimates of Doppler frequency shift from cross-correlation in the frequency domain, before the deconvolution operations are performed.

However, a signal modulated with continuous-phase frequency-shift-keying (CP-FSK) has a much more broadband frequency spectrum than a QPSK-modulated CCK signal, and gives rise to much less reliable frequency-shift estimates when attempting to cross-correlate against templates in the frequency domain. The applicant has therefore recognised a desire for a more general approach to estimating a motion-induced frequency shift in a received signal, which can potentially provide reliable estimates of motion-induced frequency shifts even for signals not having such high-peaked frequency characteristics.

The present invention therefore seeks to provide alternative approaches suitable for determining a motion-induced frequency shift in a received signal.

SUMMARY OF THE INVENTION

From a first aspect, the invention provides a receiving apparatus, comprising:
  a receiver configured to receive a signal comprising one or more instances of a transmitted signal; and
  a processing system,
wherein the processing system is configured to:
  generate data representative of a plurality of impulse response functions by deconvolving the received signal with each of a plurality of templates, wherein each template is representative of the transmitted signal shifted in frequency by a different respective frequency shift;
  evaluate a signal-to-noise measure for each of the plurality of impulse response functions; and
  identify an impulse response function of the plurality of impulse response functions for which the signal-to-noise measure satisfies a peak criterion.

From a second aspect, the invention provides a communication system comprising a transmitting apparatus and a receiver apparatus, wherein the receiving apparatus comprises:
  a receiver configured to receive a signal comprising one or more instances of a signal transmitted by the transmitting apparatus; and
  a processing system,
wherein the processing system is configured to:
  generate data representative of a plurality of impulse response functions by deconvolving the received signal with each of a plurality of templates, wherein each template is representative of the transmitted signal shifted in frequency by a different respective frequency shift;
  evaluate a signal-to-noise measure for each of the plurality of impulse response functions; and
  identify an impulse response function of the plurality of impulse response functions for which the signal-to-noise measure satisfies a peak criterion.

From a third aspect, the invention provides a method for determining a motion-induced frequency shift in a received signal, the method comprising:
  receiving a signal comprising one or more instances of a transmitted signal;
  calculating a plurality of impulse response functions by deconvolving the received signal with each of a plurality of templates, wherein each template is representative of the transmitted signal shifted in frequency by a different respective frequency shift;

evaluating a signal-to-noise measure for each of the plurality of impulse response functions; and identifying an impulse response function of the plurality of impulse response functions for which the signal-to-noise measure satisfies a peak criterion.

From further aspects, the invention provides software, and a transitory or non-transitory medium bearing the same, comprising instructions which, when executed on a processing system of a receiving apparatus configured to receive a signal comprising one or more instances of a transmitted signal, cause the processing system to:

generate data representative of a plurality of impulse response functions by deconvolving the received signal with each of a plurality of templates, wherein each template is representative of the transmitted signal shifted in frequency by a different respective frequency shift;

evaluate a signal-to-noise measure for each of the plurality of impulse response functions; and identify an impulse response function of the plurality of impulse response functions for which the signal-to-noise measure satisfies a peak criterion.

Thus it will be seen that, in accordance with the invention, the received signal is deconvolved using templates of the transmitted signal under a number of different frequency-shift assumptions, and the frequency shift that gives rise to a peak signal-to-noise measure in the resulting impulse response function is identified. The identified frequency shift may provide a best estimate of a motion-induced Doppler shift experienced by the signal. This idea of using a signal-to-noise measure to determine a frequency shift is based on an insight that a time-domain representation of an impulse response function generated by deconvolving the received signal with a template that is not frequency-matched with the received signal will typically contain large noise peaks (which may be periodic) that do not arise from received reflections of the transmitted signal. By contrast, a frequency-matched template will typically yield high peaks only for true signal paths, with only much lower level peaks arising from noise factors. Thus, a signal-to-noise measure can effectively discriminate between a frequency-matched template and non-frequency-matched templates, in such a deconvolution operation.

In some embodiments, the communication system comprises a positioning system for determining a position of the transmitting apparatus and/or the receiving apparatus in an environment.

The transmitted signal may be an acoustic signal. It may be an ultrasound signal. Ultrasonic signals are acoustic signals having a frequency higher than the normal human hearing range; typically this means signals having a base or carrier frequency above 20 kHz, e.g. between 20 and 100 kHz. Acoustic signals are particularly well suited to use in positioning systems, especially indoor positioning systems, because they travel much slower than radio waves and light waves. Embodiments using acoustic signals to determine the position of a mobile transmitter unit or a mobile receiver unit may therefore require less accurate timing in order to achieve a desired spatial resolution, compared with using speed-of-light signals.

However, while these methods have been found to be effective in acoustic real-time location systems, they can also have wider application. Thus, in some embodiments, the signal may be an electromagnetic signal, such as an optical (e.g. infrared) or radio signal.

The transmitted signal may carry encoded data. The transmitted signal may be known to the receiving apparatus.

It may be selected from a finite set of predetermined transmitted signals, which may all be known to the receiving apparatus. The transmitted signal may comprise frequency-shift-key (FSK) modulated data. It may comprise continuous-phase FSK (CP-FSK) modulated data. The data may comprise identification data, which may be specific to the transmitting apparatus (e.g. a transmitter-specific identifier or code).

In some embodiments, the received signal comprises a plurality of instances of the transmitted signal. Each instance may be received along a different path. Each instance may be received at a different time. At least two of the plurality of instances may overlap in time (e.g. with at least 10% or 20% or more of the energy of each instance arriving overlapped in time).

The receiver of the receiving apparatus may be in motion relative to a transmitter of the transmitting apparatus. One or more of the instances may be shifted in frequency relative to the transmitted signal, e.g. shifted away from a predetermined carrier frequency.

The received signal may be down-mixed. It may be sampled, e.g. to generate a sequence of complex samples. It may be down-mixed in the analogue and/or digital domains.

In some embodiments, the received signal may be critically sampled at baseband—i.e. at a sample twice the bandwidth of the transmitted signal. Not only does this result in an efficient representation of the received signal, but it may also simplify or improve the identification of the impulse response function for which the signal-to-noise measure satisfies a peak criterion—e.g. by making it more likely that peaks in the impulse response function are closer to an ideal Dirac pulse with an extent of a single time sample.

A time window may be determined which contains the one or more instances of the transmitted signal. This may be achieved by analysing the magnitudes of the samples—e.g. detecting values or peaks above a threshold magnitude.

The deconvolving may be applied to the samples in the time window. The deconvolving may be performed in the frequency domain. A Fourier transform may be applied to the samples in the time window. The deconvolving may comprise dividing a frequency spectrum of the received signal by a frequency spectrum of each template. The division may include an unknown noise term and the deconvolution may use a Tikhonov regularisation which may be specified to minimise the noise.

Each template may comprise data representing a series of complex sample values. Each template may represent a frequency-shift-key modulated signal, such as a CP-FSK modulated signal. The template data may be stored as a time-domain representation or as a frequency-domain representation. Each of the templates may represent a different frequency shift. The templates may cover a span of frequency shifts, which may include positive and negative shifts. The templates may cover 100 Hz or 200 Hz or more—e.g. from −100 Hz to +100 Hz relative to the transmitted signal. The shifts may cover all relative velocities expected to occur in normal usage. The shifts may be uniformly spaced—e.g. at an intervals between 1 Hz and 20 Hz, such as every 8 Hz or 10 Hz.

When the transmitted signal is not known unambiguously to the receiving apparatus, but may be one of a plurality of possible candidate transmitted signals (e.g. signatures), a further plurality of impulse response functions may be calculated by deconvolving the received signal with each of a plurality of further templates, wherein each further template is representative of a candidate transmitted signal shifted in frequency by a different respective frequency shift. Where there are more than two candidate transmitted signals, a corresponding number of further sets of impulse response functions may be similarly calculated, one set for each candidate transmitted signal. The same set of frequency shifts may be provided for each of the candidate transmitted signals, although this is not essential. Thus a number of deconvolutions may be performed that is equal to the number of candidate transmitted signals multiplied by the number of frequency shifts (including a zero shift). The candidate transmitted signals may include all possible signals that can be transmitted by the system, or may only include a shortlist of all possible signals—e.g. a shortlist determined from an analysis of the received signal, such as by shortlisting possible signals having an above-threshold cross-correlation with the received signal in the frequency domain.

The templates may be generated as required, or they may be pre-calculated and stored in a memory of the processing system.

The signal-to-noise measure may be any measure that can discriminate between portions of an impulse response function that correspond to signal paths and portions of the impulse response function that do not correspond to signal paths. Evaluating the signal-to-noise measure may comprise calculating a signal value, which may be representative of one or more signal components of the impulse response function, and calculating a noise value, which may be representative of one or more noise components in the impulse response function. It may comprise dividing the signal value by the noise value. The signal-to-noise measure may be a signal-to-noise ratio although this is not essential.

The signal-to-noise measure may be evaluating as a function which takes a time-domain representation of the impulse response function as input. Thus an inverse Fourier transform may be applied to the data representative of a plurality of impulse response functions.

A set of peaks in the time-domain impulse response function may be identified—e.g. using a peak-finder algorithm.

A signal value may be determined by identifying a first subset of the peaks. The signal value may be calculated from an average of the magnitudes of the peaks in this first subset—e.g. equalling the root-mean-square (RMS) of the peak magnitudes.

A noise value may be determined by identifying a second subset of the peaks. The signal value may be calculated from an average of the magnitudes of the peaks in this second subset—e.g. equalling the mean-square of the peak magnitudes.

The first and second subset may together include all the peaks identified from the impulse response function. The peaks in the first subset may all be higher than the peaks in the second subset. The first subset may be determined by adding the identified peaks to the first subset in order, from the highest peak to the lowest peak, until the peaks in the first subset meet a stop criterion. The stop criterion may determine when a rate of change falls below a threshold—e.g. when the fractional change in the square root of the sum of squares of the peak values in the first subset, as each further peak is added, drops below a threshold level, such as 3%.

The signal-to-noise measure is used to identify an impulse response function for which the signal-to-noise measure satisfies a peak criterion. The peak criterion may consider each impulse response function individually, and may simply identify the impulse response function having the highest signal-to-noise measure. However, it may consider the signal-to-noise measures as a function of frequency shift. It may identify a peak signal-to-noise measure based on the values of the signal-to-noise measures for frequency shifts around the peak. Identifying the peak impulse response function may comprise performing a curve fitting operation to the plurality of signal-to-noise measures, over the respective frequency shifts. It may comprise identifying a maximum in the curve, e.g. by differentiating the fitted curve. This can effectively apply a frequency-shift based filtering to the selection process, e.g. to exclude a peak that is manifest at only one frequency shift and is therefore more likely to be spurious.

The frequency shift of the identified impulse response function may be output or stored for further processing, e.g. as an estimate of the average Doppler shift over the time window.

In embodiments in which templates for a plurality of candidate transmitted signals are evaluated, a respective impulse response function for which the signal-to-noise measure satisfies the peak criterion may be identified for each of the candidate transmitted signals—i.e. a respective Doppler-compensated impulse response function. The signal-to-noise measures for each of the Doppler-compensated impulse response functions may be compared. The Doppler-compensated impulse response function having the highest signal-to-noise measure may be identified. The candidate transmitted signal, or signature, associated with the identified Doppler-compensated impulse response function may be output as the decoded signal. In this way, data can be communicated from the transmitting apparatus to the receiving apparatus. The frequency shift of the identified Doppler-compensated impulse response function may be output or stored for further processing, e.g. as an estimate of the average Doppler shift over the time window.

The determined frequency shift may be used in one or more further operations—e.g. to improve the decoding of subsequent communications, or to model relative motion between the transmitting apparatus and receiving apparatus. However, this is not essential, and it may be determined simply as a step within a process of decoding the received signal itself.

One or more times of arrival may be determined from the received signal. These may be used in an RTLS or positioning system to estimate a position of the transmitting or receiving apparatus. In some embodiments, the receiving apparatus may be mobile. A position of the receiving apparatus may be determined within an environment, which may be an indoors environment, such as a shopping mall, hospital, warehouse, office complex, domestic residence, etc.

The communication system may comprise a plurality of transmitting apparatuses and/or a plurality of receiving apparatuses. Each transmitting apparatus may transmit a respective transmitter-specific identification signal. It may transmit the identification signal repeatedly at intervals. The identification signals may be contained in packets, with variable data payloads, or they may be transmitted as transmitter signatures without any message data. Although the identification signal of a particular transmitter unit could vary over time, it may be constant over time; this can simplify the decoding. All the identifications signals may be the same length across all the transmitting apparatuses; this can simplify the detection and decoding. Each transmitting apparatus may transmit its identification signals at regular intervals—e.g. every one second. The processing system may identify a transmitting apparatus by decoding the received identification signal.

The mobile receiver unit may be in motion when receiving the transmitted signal, although this is not essential.

The system may be synchronised. The processing system may have access to information representative of a time of transmission of each of the signals. Range data may be determined using the times of transmission, e.g. by subtracting each time of arrival from a corresponding estimated or known time of transmission. The speed of the signals (e.g. assumed or measured) may then be used to calculate distance values from the times of flight. In some embodiments, the system may be synchronised using signals carried over wired or wireless (e.g. radio or ultrasound) channels.

A position estimate may be determined in one dimension, two dimensions or three dimensions. The position estimate may be stored or output or processed further. It may be input to a Kalman filter.

The processing system may comprise processing circuitry and/or one or more processors and memory storing software for execution by the one or more processors. The processing circuitry and/or software may implement any of the features disclosed herein.

The receiving apparatus may comprise a mobile receiver unit.

The mobile receiver unit may comprise some or all of the processing system of the receiving apparatus. This may be particularly appropriate when the mobile receiver unit comprises a display screen and powerful processor, for instance if the receiver unit is a smartphone. In such embodiments, the mobile receiver unit may be arranged to calculate and store its own position estimate. This may avoid the need to communicate data from the mobile receiver unit to be processed elsewhere—e.g., on a remote server.

However, in some embodiments, some or all of the processing system may be remote from the receiver—e.g. located on one or more servers. This may be advantageous in reducing the processing requirement on a mobile receiver unit, which can reduce its cost and power consumption, even after accounting for the need to transmit data from the mobile receiver unit (e.g., by radio). The processing system may be split across multiple processors or multiple locations, or both. The mobile receiver unit may be configured to transmit the received signal, or information derived therefrom, to a remote processing unit. The mobile receiver unit may comprise a wired or wireless transmitter, such as a radio transmitter, for transmitting information relating to the received signal.

In other embodiments, a mobile receiver unit may comprise only some parts, or even none, of the processing system—e.g., comprising a sampler for sampling the received signals—while other parts of the processing system—e.g., elements configured to use a time of arrival and decoded transmitting-apparatus identifier to determine the position of the mobile receiver unit—may reside in one or more other units, such as on a remote computer or server. The mobile receiver unit may comprise a radio, optical, or other transmitter—e.g., a Bluetooth, WiFi or cellular network transmitter. It may use the transmitter to transmit data relating to the received signals to a remote processing unit; this could be as an analogue sound file, or digital samples, or processed data.

The or each transmitting apparatus may comprise a transmitter for transmitting said signal. It may comprise a radio antenna, light-emitting element, acoustic transducer, or other appropriate means of transmitting signals. It may comprise appropriate circuitry for driving or controlling the transmission, such as a DAC, an amplifier, etc. In some embodiments, each transmitting apparatus comprises at least one ultrasound transducer for generating ultrasonic signals.

The receiver may comprise a radio antenna, light-receiving element, acoustic microphone, or other appropriate means of receiving the identification signals. It may comprise appropriate circuitry for controlling the reception, such as an amplifier, an ADC, etc. In some embodiments, the receiver comprises at least one ultrasound transducer for receiving ultrasonic signals.

The processing system and/or transmitting apparatus and/or receiving apparatus may comprise any one or more of processors, DSPs, ASICs, FPGAs. It may comprise memory for storing data and/or for storing software instructions to be executed by a processor, DSP or FPGA. It may comprise any other appropriate analogue or digital components, including power supplies, oscillators, ADCs, DACs, RAM, flash memory, network interfaces, user interfaces, etc. It may be a single unit or may comprise a plurality of processing units, which may be arranged to communicate by one or more wired or wireless links.

In some embodiments, the receiving apparatus comprises a processor and a display. It may be a mobile telephone (cellphone) or smartphone or tablet or other portable computing device. Alternatively, it may be an asset tag without any complex graphical user interface.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
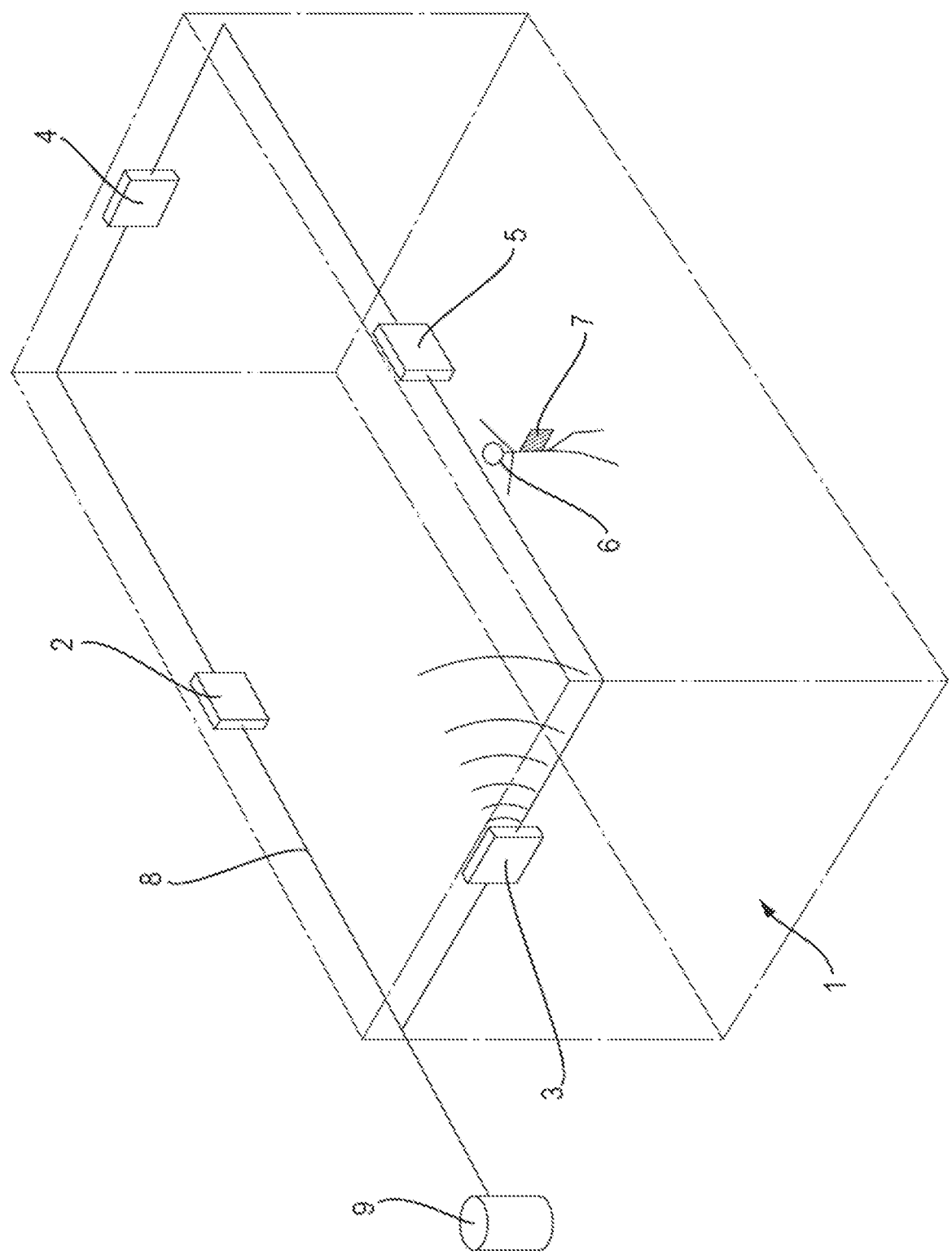
FIG. 1 is a perspective diagram of a positioning system embodying the invention.

FIG. 1 shows part of a positioning system that may be used in, for example, a shopping mall in order to determine the locations of shoppers within the shopping mall. Of course, this is just one example environment, and the positioning system could also be used in warehouses, hospitals, domestic homes, vehicles, etc.

FIG. 1 shows a room 1, to the walls of which are affixed four static transmitter units 2, 3, 4, 5. A person 6 in the room is carrying a mobile receiver unit 7. A network cable 8 connects each transmitter unit 2, 3, 4, 5 to a server 9, which is typically located in another room or in another building. These components cooperate to provide a positioning system, capable of estimating the three-dimensional location of the mobile receiver unit 7 within the room 1. In practice, the system may have further similar transmitter units, installed throughout a building or series of rooms, and a plurality of similar mobile receiver units attached to, or incorporated into, people, animals, vehicles, robots, stock, equipment, etc.

Figure 2:
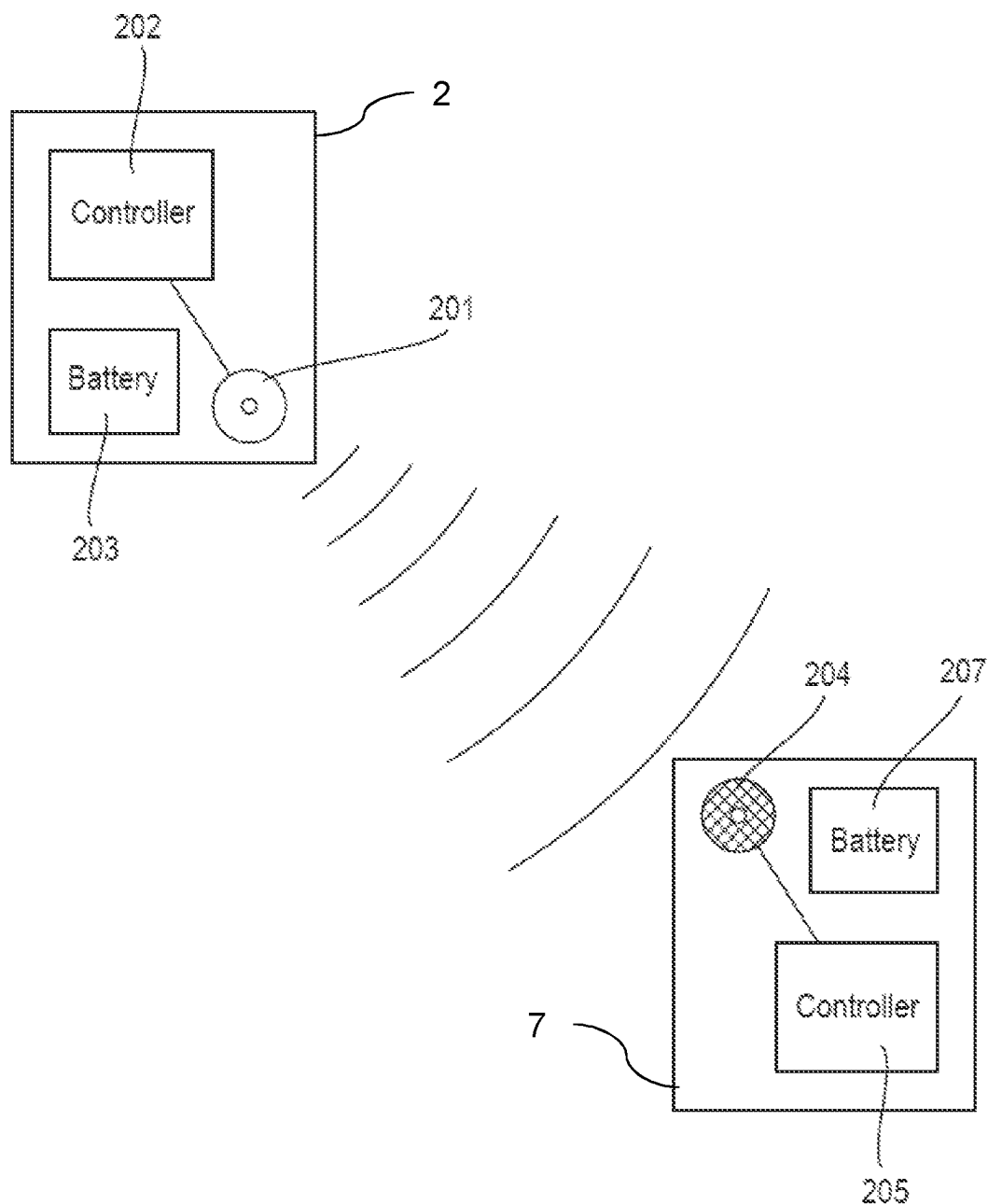
FIG. 2 is a schematic drawing of a static transmitter unit and a mobile receiver unit for use in the positioning system.

FIG. 2 shows a representative one 2 of the transmitter units 2, 3, 4, 5, and a mobile receiver unit 7. The transmitter unit 2 has an ultrasonic sounder 201, a controller 202 for causing the ultrasound transducer 201 to transmit ultrasonic signals, and battery 203 for supplying power to the transmitter unit. The other transmitter units 3, 4, 5 are similarly configured. The mobile receiver unit 7 has a microphone 204 capable of receiving ultrasonic signals from the transmitter units 2, 3, 4, 5, a microcontroller unit (MCU) 205 for sampling and processing the received signals, and a battery 207 for powering the mobile receiver unit 7. The transmitter units 2, 3, 4, 5 and mobile receiver unit 7 may have further standard electronic components such as radio transceivers, wired-network interfaces, display screens, buttons, etc. In some embodiments, the mobile receiver unit 7 is a tablet or mobile telephone (cellphone) such as an Apple™ or Android™ smart phone.

Although this description relates to ultrasound signals, the same principles may be applied to audible acoustic signals, or to electromagnetic signals such as infrared signals or radio signals.

The microcontroller units 202, 205 can include one or more processors, DSPs, ASICs and/or FPGAs. They can include memory for storing data and/or for storing software instructions to be executed by a processor or DSP. They can include any other appropriate analogue or digital components, including amplifiers, oscillators, filters, ADCs, DACs, RAM, flash memory, etc.

Although the transmitter units 2, 3, 4, 5 are here shown as being static relative to the environment 1, it will be appreciated that, in other embodiments, they may be mobile—e.g., one or more of the transmitter units could be a mobile telephone or device in the possession of a respective user.

In use, the server 9 causes each transmitter unit 2, 3, 4, 5 to transmit, at regular intervals (e.g. every one second), a signature unique to that transmitter unit. It will be understand that, in a large deployment, the signatures may be unique only within a locality; if signatures are reused across a system, additional data is preferably used to differentiate between identical signatures. Each signature is encoded on an ultrasonic carrier—e.g., a 20 kHz or 40 kHz carrier. The signature may be contained in a longer transmission that also has one or more additional elements, such as a preamble and/or data content, preferably also encoded on the same ultrasonic carrier band.

Especially in embodiments having a large number of transmitter units, it may be desirable to transmit additional information that allows the mobile receiver unit 7 to distinguish between identical signatures from different transmitter units 2, 3, 4, 5. For example, a short-range RF signal, or additional data encoded in an ultrasound signal transmitted by one or more of the transmitter units 2, 3, 4, 5, can allow signatures to be reused in different locations across a site without ambiguity.

The signature may be encoded using any appropriate frequency-shift or phase-shift encoding, but in one set of embodiments, the signature of each transmitter unit 2-5 comprises a binary identifier encoded using continuous-phase frequency-shift-keying (CP-FSK) modulation.

The mobile receiver unit 7 receives and demodulates the ultrasound signals to identify signatures that have been transmitted by transmitter units 2, 3, 4, 5 within audible range of the receiver unit 7, and to determine one or more times of arrival for each signature.

The receiver unit 7 uses an internal clock to timestamp received signatures. The receiver unit 7 may be synchronised with each of the transmitter units 2, 3, 4, 5 (and optionally with the server 9) and can therefore also calculate a time of flight (TOF) for each signature it receives. By combining three or more TOF measurements from known transmitter locations, the position of the mobile receiver unit 7 can be determined using geometric principles of trilateration (also referred to as multilateration). This synchronisation may be carried out using a radio channel, such as a Bluetooth Low Energy™ connection, or in any other suitable way.

If the receiver unit 7 is not synchronised with the transmitters 2-5, a time difference of flight (TDOF) method can still be used to determine the position of the receiver unit 7; however, in this case, more transmitter units may have to be in range to get an accurate position estimate.

The position of the receiver unit 7 may be estimated in three dimensions (e.g., as x, y, z Cartesian coordinates relative to a reference frame of the room 1 or building), or in two dimensions (e.g., on a horizontal plane only), or in one dimension (e.g. as a distance along a corridor). The position determination calculations may be performed on the mobile receiver unit 7, or the receiver unit 7 may send information about the received signals, including timing or distance information, to the server 9, which may perform part or all of the calculations.

The receiver unit 7 will typically receive the same acoustic signal from a transmitter units 2-5 along a direct path (assuming there is a clear line of sight between them) and also along one or more indirect paths, after reflection off one or more surfaces in the environment. The signals may arrive overlapped in time, which can make it challenging to decode the signature accurately. This is especially likely when using low-frequency ultrasound—e.g. around 20 kHz—which has limited bandwidth, so each transmitter-unit identifier takes a significant length of time to transmit. The strength of the instances received along the indirect (reflected) signals will typically be lower than the strength of the direct-path signal, although this is not necessarily always the case (e.g., if a microphone on the receiver unit 7 is angled towards a highly reflective surface such as a glass window pane).

The times of flight of any direct-path signals can be input to a multilateration positioning algorithm. The times of flight of any reflections (echoes) may, in some embodiments, be disregarded in the geometric fit process (although the reflected signals may potentially assist in decoding the received direct-path signature). However, in other embodiments, the times of arrival of reflections may also be used when determining geometric information about the position of the receiver unit 7. Such embodiments may make use of known locations of major reflective surfaces in the environment. Techniques involving real and virtual transmitter locations, which may be employed in such embodiments, are disclosed in WO 2018/162885, filed 5 Mar. 2018, the contents of which are hereby incorporated by reference.

The location of the receiver unit 7 can be estimated at least in part from a signature received as multiple instances along a set of paths, each instance arriving at a different respective time, and from an acoustic model representing the environment. The acoustic model may comprise an impulse response function that is estimated from the received signals.

Doppler shift occurs whenever the mobile receiver unit 7 is moving towards or away from one or more of the transmitters units 2, 3, 4, 5.

The change in frequency due to Doppler shift is given by $$\Delta f = \frac{v}{c} f,$$

where v is the component of velocity of the mobile receiver unit 7 in a direction towards or away from the transmitter unit 2, 3, 4, 5, c is the velocity of the waves in the air, and f is the frequency of the signal emitted from the transmitter unit. A positive v represents movement of the mobile receiver unit 7 towards a transmitter unit 2, 3, 4, 5.

The relatively low value of speed of sound in air (approximately 340 m/s) causes even low speed movements to create relatively large frequency shifts in the transmitted signal. As an example, if the person 6 carrying the mobile receiver unit 7 walks at a speed of 1.5 metres per second towards one of the transmitter units 2, 3, 4, 5, an acoustic signal at 20 kHz will experience a frequency rise of around 90 Hz.

Since Doppler shift can significantly affect the phase and frequency of the received signals, the mobile receiver unit 7 cannot easily use coherent detection methods. Instead, asynchronous detection methods are used.

The system includes a Doppler-shift compensation mechanism to enable accurate decoding of the transmitted signatures, as described in more detail below.

Although processing steps are, for simplicity, described herein as being carried out by the receiver unit 7, it should be understood that, in some embodiments, these steps may instead be carried out wholly or partially by the server 9, where appropriate. Intermediate results may be communicated between the receiver unit 7 and the server 9 by any appropriate means, such as via a radio link.

Figure 3:
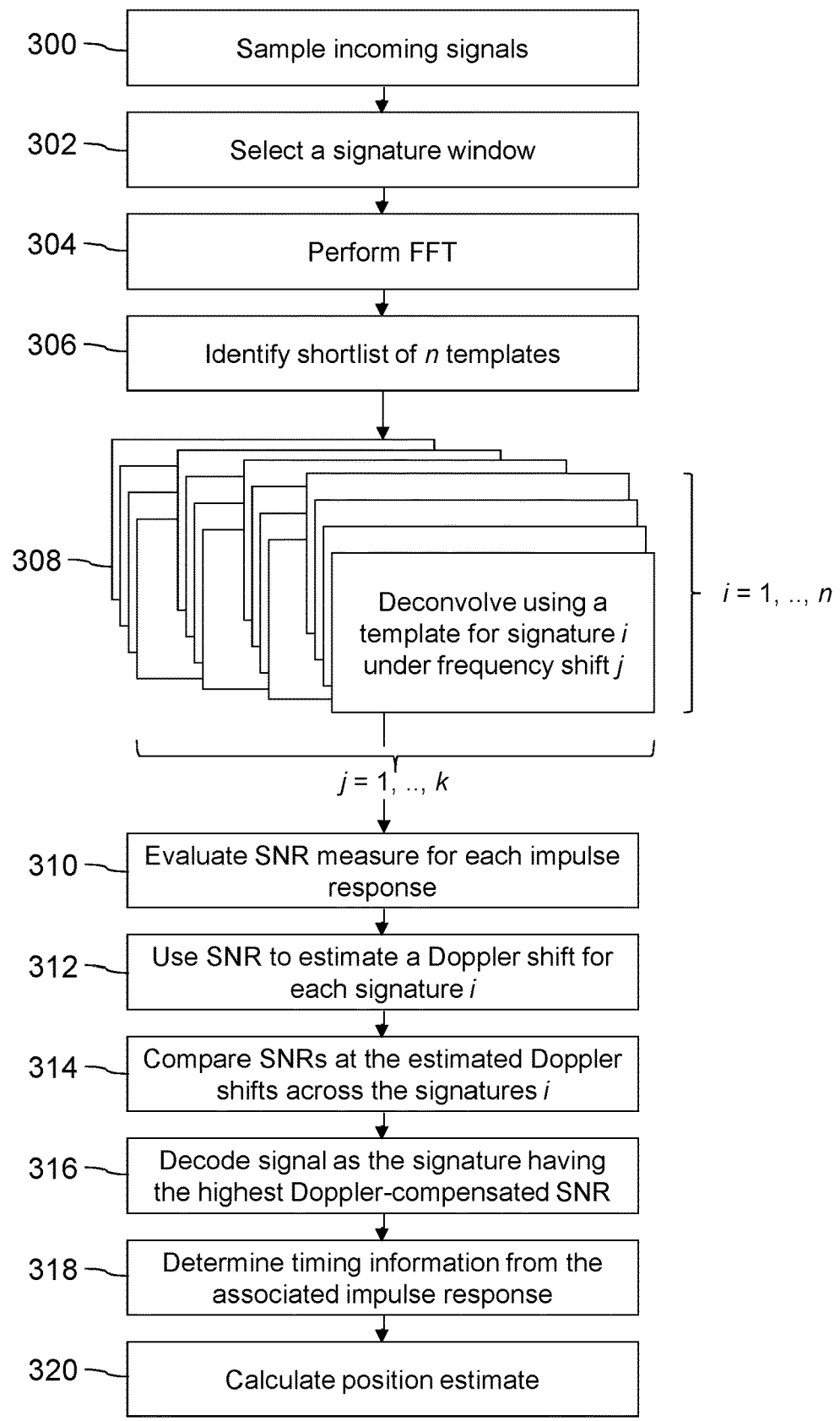
FIG. 3 is a flow chart of operations carried out by the mobile receiver unit and/or the server to estimate the position of the mobile receiver unit.

FIG. 3 is a flow chart showing some of the key operations carried out by the mobile receiver unit 7. In other embodiments, some or all of these operations may be performed on the server 9.

First, the incoming audio, received at the microphone 204, is sampled 300. This can include a down-mixing process, using analogue and/or digital mixing techniques, to generate a stream of complex IQ baseband samples. The received signal may be critically sampled—i.e. at a sample rate close to the Nyquist frequency for the transmitted signatures.

A time window selection step 302 monitors the sample stream to identify clusters of incoming signature instances. It selects a sequence of samples that spans a cluster of one or more overlapping signature instances (including a margin at either end). Individual, non-overlapping signature instances can be decoded and time-stamped relatively straightforwardly; however, overlapping signature instances are more difficult to decode. Due to the temporally sparse transmission schedules used by the transmitter units 2-5, overlapping signature instances are most likely to arise from a single signature transmission which has reached the microphone 204 along multiple paths; however there may at times be overlap from two different signature transmissions, and this can still be processed reliable by means of appropriate time-of-arrival thresholding, and the deconvolution processes disclosed herein.

The time window selection 302 may use techniques similar to the peak-identification processes disclosed in US 2019/0204408, filed 29 Dec. 2017, the contents of which are hereby incorporated by reference. A set of peaks (e.g. a set of two peaks) may be selected from the received acoustic signals. Such peaks may be selected from a time-domain representation of the magnitude of the received signals. The peaks can be selected based at least in part on an amplitude of each peak and an order of occurrence of the peaks. For instance, the selected peaks can include the first two received peaks having an amplitude greater than a threshold. Each peak of the set of selected peaks can be assigned to a transmitter location based at least in part on the acoustic model. The assignment can be determined based at least in part on an orientation of the mobile communication device with respect to the transmitter locations, and an angular sensitivity of one or more acoustic transducers (e.g. microphones) of the receiver unit 7, and/or an angular sensitivity of a transducer of the transmitter 2-5. The orientation of the mobile receiver unit 7 can be determined, for instance, using one or more on-board sensors such as a gyroscope, compass or accelerometer. The orientation can be determined with respect to the transmitter locations based at least in part on the known locations of the transmitters 2-5 defined in the acoustic model.

The selected peaks can be selected to correspond to signals associated with direct-path instances and one or more single-reflection paths based at least in part on the assumption that the order of arrival of the peaks corresponds to the number of reflections due to the fact that the acoustic signals associated with higher reflection orders generally travel greater distances than acoustic signals associated with lower reflection orders. In this manner, the peaks can be selected based at least in part on the assumption that a signal (e.g. peak) from a $0^{th}$ order transmitter location (i.e. a real transmitter location and corresponding direct-path signal) will arrive prior to a signal from a $1^{st}$ order transmitter location (i.e. a virtual transmitter location based on one reflection), which will arrive prior to a signal from a $2^{nd}$ order transmitter location (i.e. after reflections off two different surfaces).

Similarly, an assignment of the peaks to respective real or virtual transmitter locations, in a subsequent geometric location operation 320, may be made based on the order of arrival of the peaks. For instance, the first peak can be assigned to the $0^{th}$ order transmitter location, and the second peak can be assigned to a $1^{st}$ order transmitter location.

The samples in the selected signature window are then converted to the frequency domain in a discrete finite Fourier transform (FFT) step 304.

A set of n candidate signature templates is then selected 306. Each template is a complex digital baseband representation of a respective identification code (transmitter-specific identification data), as it is transmitted, at intervals, by one of the transmitter units 2-5, using the CP-FSK modulation. The selected set may include all the possible signatures transmitted by the transmitter units 2-5 in the system, or it may be a subset of these. A shortlist may be established by taking the magnitude of the frequency spectrum of the received signal in the signature window and the frequency spectrum of each signature template and calculating a normalised cross-correlation between them. Signatures that have a normalised cross-correlation above a threshold (e.g. greater than 0.3) may be shortlisted, while the others are disregarded. The shortlist of candidate templates may be further refined based on other characteristics, such as timings.

Next, multiple deconvolution operations 308 are performed. Each deconvolution is implemented using a sample-wise complex division of the frequency-domain representation of the time-windowed received signals by the frequency-domain representation of a respective template (i.e. a magnitude and phase divided by another magnitude and phase). According to the standard Convolution Theorem, division in the frequency domain is equivalent to deconvolution in the time domain. Each deconvolution operation therefore outputs frequency-domain data representing an estimated impulse response function of the environment—i.e. representing how the environment, including its acoustically reflective surfaces, has altered the timing, phase and amplitude of the transmitted signal to produce the signal received at the mobile receiver unit 7. In some embodiments, the deconvolution allows for a noise term to represent random noise (e.g. white noise). If a noise term is included, the deconvolution operation may place some constraints on the possible solutions in order to stabilise the problem—e.g. by using a Tikhonov regularisation, with the Lagrangian multiplier, $\lambda$, of the constraint selected to be a real constant with a value that minimises noise.

The windowed samples are deconvolved using each of the n shortlisted templates. Moreover, each shortlisted template is also subjected to one of k possible frequency shifts, thereby requiring a total of n×k separate deconvolution calculations. These shifts are easily applied to the frequency-domain representation of the template by shifting the values along the frequency bins by the desired frequency shift. Each template may, for example, be used to produce twenty-five different frequency-shifted templates (k=25), spanning the interval −100 Hz to 100 Hz in uniform 8 Hz intervals. This corresponds to a 1.5 m/s radial velocity of the mobile receiver unit 7, so represents a reasonable trade-off between velocity resolution and computational effort. Of course, other shifts may be used instead, such as every 1-10 Hz. In some embodiments, the intervals may be non-uniform.

The impulse response estimates are then transformed back to the time domain by an inverse FFT operation, and a signal-to-noise ratio (SNR) measure is evaluated 310 for each of the n×k channel impulse response estimates generated by the deconvolution process 308. This process is described in more detail below with reference to FIG. 4.

The SNR measure of each impulse response function is then used to estimate 312 a most likely Doppler shift, for each of the n shortlisted signatures. This is done by selecting the Doppler index at which the SNR measure satisfies a peak criterion. The peak criterion could simply identify the maximum SNR value (i.e. picking the Doppler shift having the largest SNR), but the peak criterion may be more complex. A polynomial curve fitting (e.g. between 4 and 12 point fit) operation, following by differentiation, over frequency shift, may be used to find a qualifying maximum peak. This can allow sub-index resolution (e.g. finer than the 8 Hz step size) and/or can prevent selecting very narrow maxima. The polynomial may be selected to control the frequency width of the maxima that qualify. The is based on the idea that a maximum should have a minimum frequency extent to be physical (e.g. at least 30 Hz) rather than spurious.

Next, these peak SNR values are compared 314 across the n signatures, by comparing the SNR value for each signature template at its respective estimated Doppler shift. This is effectively a comparison of Doppler-compensated signature-template deconvolution results. The highest SNR value can identify the most likely signature that was transmitted by the transmitter unit based on what was receiver—i.e. it allows the received signal to be decoded. In some embodiments, rather than just identifying a single decoded signature, the SNR values can be used to determine a set of decoding probabilities between the winning signature and the next best signatures, using code error probability theory.

At this stage, the signature has now been decoded, and the Doppler shift has been estimated (as the Doppler shift estimated for the decoded signature template in the Doppler-shift estimation step 312).

This allows the received cluster of signature instances to be assigned to a particular source transmitter unit 2-5. It also yields an estimate of a radial component of velocity of the mobile receiver unit 7, relative to the identified transmitter unit. The velocity estimate can be input to a motion-based model, for more accurate tracking of the mobile receiver unit 7, e.g. using a Kalman filter.

This use of SNR values to decode the received signal is based on the insight that, when an inverse FFT is taken of the result of a division, in the frequency domain, of a received signal and a template that is not correctly Doppler-shift matched to the signal, the magnitude of the resulting impulse response function (i.e. the path trace) typically contains large, often-periodic, noise peaks. Since the path traces of a reflected acoustic signal in an environment can reliably be modelled as a summation of delta peaks, it has found that the actual Doppler shift, and the transmitted signature, can reliably be determined by scoring the path traces using a signal-to-noise metric, as disclosed herein.

In order to estimate the location of the receiver unit 7, one or more times of arrival are also determined 318 from the received signal. In some embodiments this can be done by identifying the temporal position of the largest peak in the time-domain impulse response function for the decoded signature template, with the estimated Doppler shift. The largest peak will typically correspond to the direct-path signal. The times of other peaks, corresponding to $1^{st}$ or higher order reflective paths, may also be determined, if desired. In other embodiments, a time of arrival can be determined by applying a threshold to a correlation of the energy of the received signal; this may potentially give a more reliable measurement. The time instance where the threshold occurs may be corrected for any delay caused by the length and shape of the energy correlation window. The delay may be estimated by running an ideal simulated signal, occurring at a controlled time instance, through the receive signal processing chain and measuring its time of arrival.

In a synchronised system, the time of arrival can straightforwardly be used to determine a time-of-flight distance between the transmitter unit 2-5 and the mobile receiver unit 7.

Each new time of arrival can then be input to a position estimation algorithm 320. This collects times of arrival for different transmitter units 2-5, over time, and uses them to determine updated position estimates for the mobile receiver unit 7 over time. It may solve a linear optimisation problem (e.g. a weighted least-squares regression), which may relate to the intersection of spheres. The position estimation algorithm may use the estimated Doppler velocities as a further input. It may use decoding error information, as described above, to weight the contribution of respective timing information for a signature window based on a confidence level in the assignment of the distance to a particular transmitter unit 2-5.

A position estimate, or a time-series of estimates, may be used to control a behaviour of the mobile receiver unit 7, such as the displaying of information or other operations. The position of the receiver unit 7 may be displayed, e.g., on a map, on a screen of the receiver unit 7, or of a remote device—e.g. of a client computer connected to the server 9.

Figure 4:
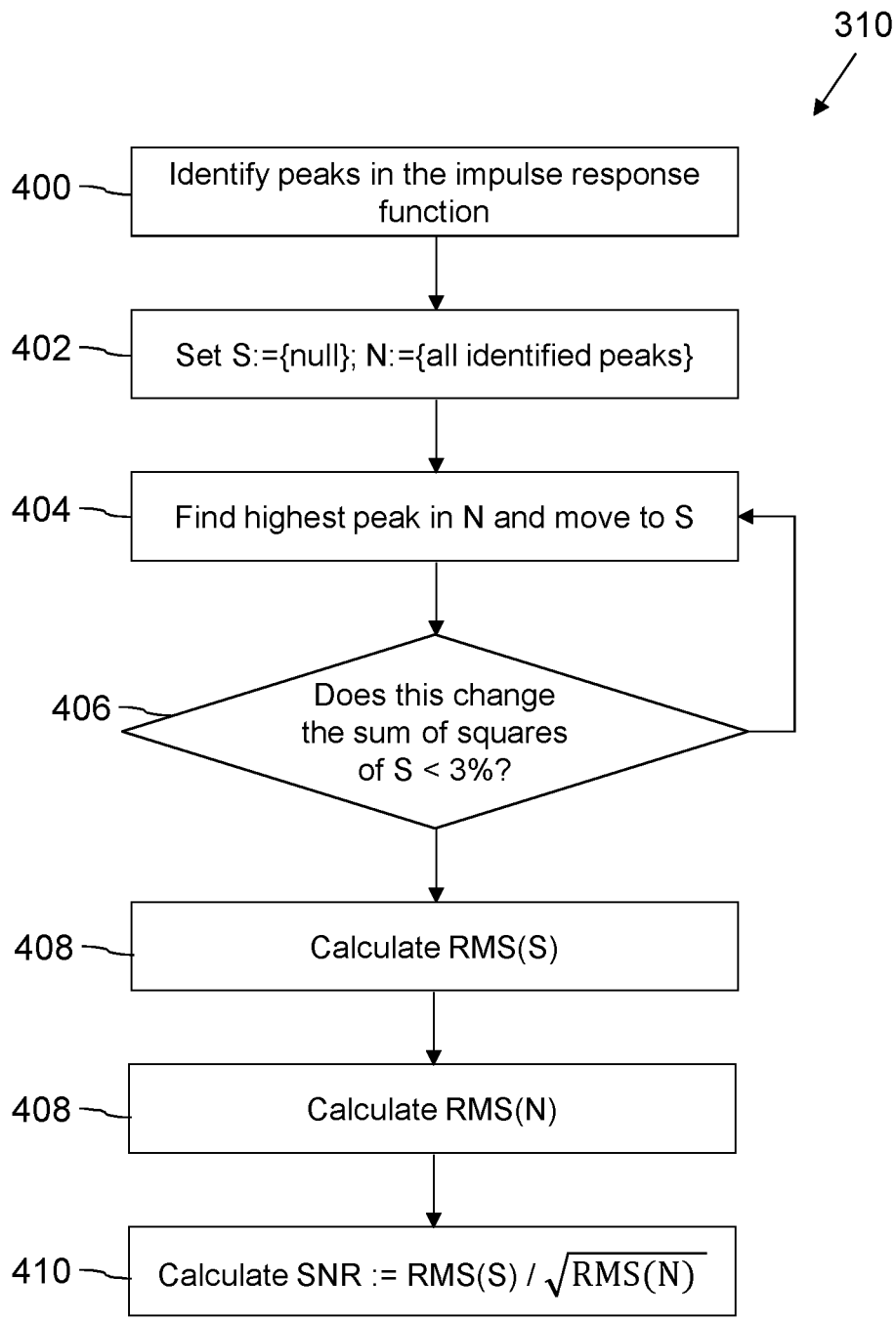
FIG. 4 is a flow chart of operations for estimating a signal-to-noise ratio (SNR) measure.

FIG. 4 is a flow chart showing more detail of the step 310 of evaluating the SNR measure.

Data representing an impulse response function is processed to be in the time domain.

First, peaks in the magnitude of the time-representation of the impulse response are identified 410. This may done simply by identifying absolute or local maxima (e.g. under the assumption that each peak is only a single sample wide, which may be a reasonable assumption if the received signal is critically sampled), or any appropriate peak-finder algorithm may be used, with any suitable qualifying criteria. In some embodiments, it may be done using a $3^{rd}$ order polynomial peak finder algorithm. The peaks may be sorted in descending of order of magnitude.

Next, two sets, S & N, are initialised 402. Initially, all the peaks are added to the "noise" set, N, while the "signal" set, S, is empty. In some embodiments, each peak may be represented in a set simply by its magnitude value.

Then, a looped process is started in which the peak with the largest value in set N is removed 404 from set N and included in set S.

The square root of the sum of the squares of the peak values in the set S is then calculated and compared 406 with the square root of the sum of squares of S prior to the most recent peak being included in S. For as long as the change is greater than 3%, the process loops, and the next-largest value in N is moved 404 to S, and so on. If the change is less than 3%, the loop exits. This is indicative of all the high peaks having been collected in the set S, with only the low-value peaks remaining in set N (since a low-value peak would not significantly affect the sum of squares of S if it were moved from N to S). Of course, thresholds other than 3% may be used if appropriate.

The root-mean-square, RMS(S), of the peak values in set S is then calculated 408 and stored in the memory of the microcontroller unit 205.

Next, the root-mean-square, RMS(N), of the peak values in set N is calculated 410 and stored in the memory of the microcontroller unit 205.

Then, the SNR measure is calculated 410 as RMS(S) divided by the square-root of RMS(N). This SNR value is then used as described above with reference to step 312 and onward.

In some embodiments, the resulting position estimates (and optionally any position error values and/or velocity vectors) may be input to a Kalman filter module to generate improved position data. This may also combine acoustic-based position estimates with data from other sensors, such as accelerometers, to improve accuracy even further.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A receiving apparatus, comprising:
a receiver configured to receive a signal comprising one or more instances of a transmitted signal; and
a processing system,
wherein the processing system is configured to:
generate data representative of a plurality of impulse response functions by deconvolving the received signal with each of a plurality of templates, wherein each template is representative of the transmitted signal shifted in frequency by a different respective frequency shift;
evaluate a signal-to-noise measure for each of the plurality of impulse response functions; and
identify an impulse response function of the plurality of impulse response functions for which the signal-to-noise measure satisfies a peak criterion.

2. The receiving apparatus of claim 1, wherein the receiver comprises an acoustic transducer and the received signal is an acoustic signal.

3. The receiving apparatus of claim 1, wherein each template comprises data representing a continuous-phase frequency-shift-key modulated transmitted signal.

4. The receiving apparatus of claim 1, wherein the processing system is configured to deconvolve the received signal with each of the plurality of templates by applying a Fourier transform to samples representing the received signal to generate a frequency spectrum of the received signal, and by dividing the frequency spectrum of the received signal by a frequency spectrum of each template.

5. The receiving apparatus of claim 1, wherein the respective frequency shifts are spaced at uniform intervals over a range of positive and negative frequency shifts.

6. The receiving apparatus of claim 1, wherein the transmitted signal is one of a plurality of candidate transmitted signals and wherein the processing system is configured to calculate one or more further pluralities of impulse response functions by deconvolving the received signal with each of a plurality of further templates, wherein each further template is representative of a candidate transmitted signal shifted in frequency by a different respective frequency shift.

7. The receiving apparatus of claim 1, wherein the processing system is configured to evaluate the signal-to-noise measure for each of the plurality of impulse response functions by:
calculating a signal value that is representative of one or more signal components of the impulse response function;
calculating a noise value that is representative of one or more noise components in the impulse response function; and
dividing the signal value by the noise value.

8. The receiving apparatus of claim 7, wherein the processing system is configured to:
identify peaks in a time-domain representation of each impulse response function;
calculate the signal value by identifying a first subset of the identified peaks and calculating an average of magnitudes of peaks in the first subset; and
calculate the noise value by identifying a second subset of the identified peaks and calculating an average of magnitudes of peaks in the second subset,
wherein the first and second subsets together contain all the identified peaks and wherein the peaks in the first subset are all higher than the peaks in the second subset.

9. The receiving apparatus of claim 8, wherein the processing system is configured to determine the first subset of peaks by adding identified peaks to the first subset in order from the highest peak to the lowest peak until a fractional change in a square root of a sum of squares of the peak values in the first subset as each further peak is added drops below a threshold level.

10. The receiving apparatus of claim 1, wherein the processing system is configured to identify the impulse response function for which the signal-to-noise measure satisfies the peak criterion by performing a curve fitting operation on the plurality of signal-to-noise measures, over the respective frequency shifts, and identifying a maximum in the curve.

11. The receiving apparatus of claim 1, wherein the processing system is configured to:
deconvolve the received signal with templates representative of a plurality of candidate transmitted signals and representative of a plurality of respective frequency shifts for each candidate transmitted signal;

identify, for each of the plurality of candidate transmitted signals, a respective impulse response function for which the signal-to-noise measure satisfies the peak criterion;

compare the signal-to-noise measures for each of the identified impulse response functions to determine an impulse response function, of said identified impulse response functions, having a highest signal-to-noise measure; and decode the received signal as being the candidate transmitted signal associated with said impulse response function having the highest signal-to-noise measure.

12. The receiving apparatus of claim 1, wherein the processing system is configured to determine a frequency-shift estimate for the received signal from the identified impulse response function of the plurality of impulse response functions for which the signal-to-noise measure satisfies the peak criterion.

13. The receiving apparatus of claim 1, wherein the processing system is configured to determine one or more times of arrival from the received signal, and to use the times of arrival to estimate a location of the receiving apparatus in an environment.

14. The receiving apparatus of claim 1, wherein the receiver is configured to generate baseband complex samples of the received signal that are critically sampled for the transmitted signal.

15. A method for determining a motion-induced frequency shift in a received signal, the method comprising:

receiving a signal comprising one or more instances of a transmitted signal;

calculating a plurality of impulse response functions by deconvolving the received signal with each of a plurality of templates, wherein each template is representative of the transmitted signal shifted in frequency by a different respective frequency shift;

evaluating a signal-to-noise measure for each of the plurality of impulse response functions; and identifying an impulse response function of the plurality of impulse response functions for which the signal-to-noise measure satisfies a peak criterion.

16. The method of claim 15, wherein the signal encodes data modulated using a continuous-phase frequency-shift-key modulation.

17. The method of claim 15, wherein at least one of the instances of the transmitted signal experiences a motion-induced Doppler shift before being received.

18. The method of claim 15, comprising receiving a plurality of instances of the transmitted signal overlapping in time.

19. The method of claim 15, comprising using the identified impulse response function to decode the transmitted signal.

20. A non-transitory computer-readable storage medium storing computer software comprising instructions which, when executed on a processing system of a receiving apparatus configured to receive a signal comprising one or more instances of a transmitted signal, cause the processing system to:

generate data representative of a plurality of impulse response functions by deconvolving the received signal with each of a plurality of templates, wherein each template is representative of the transmitted signal shifted in frequency by a different respective frequency shift;

evaluate a signal-to-noise measure for each of the plurality of impulse response functions; and identify an impulse response function of the plurality of impulse response functions for which the signal-to-noise measure satisfies a peak criterion.

* * * * *